J. W. CARLEY,
Assignor of part interest to J. W. STOREY and A. B. CARLEY.
EARTH BORER AND EXCAVATOR.
No. 10,027. Reissued Feb. 7, 1882.
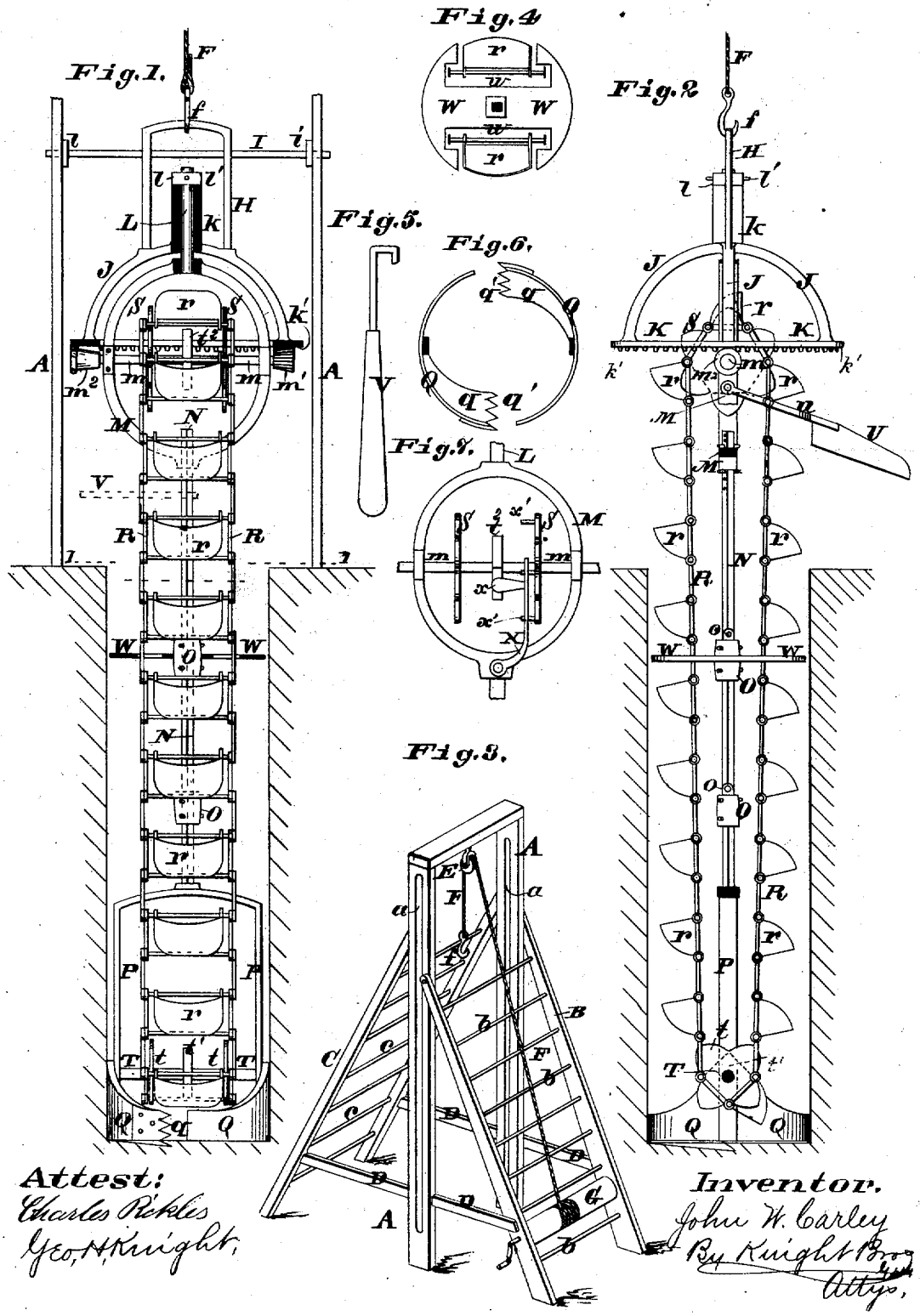
Attest:
Charles Pickles
Geo. H. Knight.
Inventor.
John W. Carley
By Knight Bros.
Attys.
N. PETERS, Photo-Lithographer, Washington, D. C.

UNITED STATES PATENT OFFICE.

JOHN W. CARLEY, OF COTTON GIN, TEXAS, ASSIGNOR OF PART INTEREST TO JULIUS W. STOREY AND ANDREW B. CARLEY, OF SAME PLACE.

EARTH BORER AND EXCAVATOR.

SPECIFICATION forming part of Reissued Letters Patent No. 10,027, dated February 7, 1882.

Original No. 234,532, dated November 16, 1880. Application for reissue filed November 9, 1881.

*To all whom it may concern:*

Be it known that I, JOHN W. CARLEY, of Cotton Gin, in the county of Freestone and State of Texas, have invented a certain new and useful Improvement in Earth Boring and Excavating Machines, of which the following is a full, clear, and exact description, reference being had to the accompanying drawings, forming part of this specification.

The object of my invention is to furnish an apparatus for boring wells, prospecting and mining shafts, post-holes, and various other purposes where earth is to be loosened and removed, and which is so constructed as to operate continuously when in use, the earth being removed as fast as it is loosened.

In the drawings, Figure 1 is an elevation, part in section. Fig. 2 is a similar view, other parts being in section. Fig. 3 is a perspective view of the derrick. Fig. 4 is a plan section taken on line 1 1, Fig. 1. Fig. 5 represents a lever for operating the auger. Fig. 6 is a top view of the auger. Fig. 7 is an elevation of the ring.

A A represent two upright guide-posts suitably connected together at top, and having vertical slots *a*. They are held in a vertical position by inclined braces B C. The uprights and braces are connected together by strengthening-braces D.

To the top of the derrick A B C D is secured a pulley, E, around which passes the hoisting-rope F, having a hook, *f*, at one end, and having its other end secured to and wound around a windlass, G, which is pivoted to the lower part of one of the braces B C. The braces are provided with rounds *b c*, to form ladders for convenience in ascending the derrick when desired. The derrick is put over the place where the well or shaft is to be made, and the rope F connected with the bail H by means of the hook *f*.

I is a cross-bar, to which the bail H is secured, and whose opposite ends have bearing respectively in the slots *a* of the guide-posts A.

To each end of the cross-bar I is secured a head, *i*, just inside of each guide-post. By this arrangement it will be seen that the upper portion of the machine will be held in a vertical position at all times while allowed to move up and down freely.

The ends of the bail H are rigidly secured to or formed solidly upon the curved spokes J, or to the hub *k* of the gear-wheel K. The teeth of the gear-wheel are formed upon the inner part of the under side of its rim, there being a smooth portion, *k'*, between the teeth and the periphery of the wheel. With the described connection between the gear-wheel and the derrick it will be seen that the former cannot revolve, while its vertical movement is not in the least interfered with.

L is a short shaft, secured rigidly by its lower end to the upper portion of the vertical ring M. Said shaft is journaled in the elongated hub *k* of the gear-wheel K, and is kept from moving vertically downward by the collar *l*, secured to its upper end, just above the hub, by a pin, *l'*. The shaft L is connected to the main shaft N of the auger by the ring M, which has journaled at or near its center a horizontal shaft, *m*. To one end of this shaft *m* is rigidly attached a gear-wheel, *m'*, whose teeth mesh into the teeth of the gear-wheel K. On the other end of the shaft *m* is a small wheel or idler, $m^2$, the face of which rests against the smooth portion *k'* of the gear-wheel, to hold the shaft *m* and the hanging parts of the machine steady while being operated.

The lower side of the ring M has a square socket to receive the upper end of the square shaft N. The shaft is secured in place by pins passing through the said sections above and below the socket, as shown. Several holes are made in the shaft, as shown, to allow of its adjustment to take up any slight slack there may be in the chain. The shaft N consists of sections, so that as the hole increases in depth a new section or sections of shafting may be added. The sections are connected together by couplings O, each having an apertured lug, *o*, to receive the hook of the hoisting-rope, so that when it is desired to add additional sections to the shaft N the lower part of the auger may be thus sustained.

To the lower end of the shaft N is attached a yoke or bail, P, the arms of which are attached to the barrel Q of the auger. The auger has bits *q*, which should have teeth *q'* when the auger is used in hard ground. As the earth is loosened by the auger it is taken up by the buckets *r*, secured to the endless chain R. The chain is of such a character that it can be easily disconnected at any desired point for adding additional lengths to increase the length of the whole to correspond with the increased length of the shaft. The buckets are secured to the cross-bars of the chain. The buckets are designed to have projections or shoes upon their outer sides to protect them from wear and to cause them to pulverize the earth as it is loosened by the auger. The endless chain passes around and is driven by suitable chain-wheels, S, rigidly secured to the shaft *m* of the ring M, and around similar wheels, *t*, rigidly secured to the shaft T, which is journaled in the sides of the auger Q. Thus it will be seen that as the shaft N is turned the endless chain will have a compound vertical and horizontal movement imparted to it through the means of the gearing above described. The vertical movement of the chain revolves the shaft T in the bucket by means of the chain-wheels thereon, and on the center of this shaft T is a wheel, $t'$, having four sides, whose office is to come in contact with and support the back of each bucket as it is being filled with dirt. This wheel is rigidly secured to the shaft, so as to turn with it. A similar wheel, $t^2$, only having six sides, is rigidly secured to the middle of the shaft *m*, to come in contact with and support the backs of the buckets as they pass over the shaft *m*. With this construction the buckets load themselves as they pass under the shaft T and empty themselves as they pass over the shaft *m*. As the earth is discharged from the buckets it falls into the spout U, which conveys it to the ground around the hole being bored. The spout U is connected to the ring M by arms *u*.

By a machine thus constructed it will be seen that the loosening of the earth by and the removal of the earth from the auger go on simultaneously.

The parts are operated by means of a lever, V, applied to the shaft N of the auger. The motion given to the lever may be by any suitable motive power.

The endless chain of buckets is kept from lapping around the shaft of the auger and from striking against the sides of the hole being bored by disk-guides W, secured to the couplings O or to the shaft N. One or more of these guides may be used, according to the length of the shaft. There is an opening, *w*, in each side of the disk to permit the passage of the buckets and chain. (See Figs. 1 and 4.) These chain-guides might practically be of some value as guides to the shaft N, where they are of sufficient size to fit snugly the hole being bored; but that is not the object of this invention, their office being, as before stated, to keep the endless chain in its proper position.

In practice it has been found that a chain-guide in this class of machines is of every importance, especially when the hole being bored gets to be of considerable depth, because the chain will constantly be lapping around the shaft of the auger or striking against the sides of the hole, as stated.

When the machine is constructed for digging post-holes it is made small, and the derrick, which may be a small frame, is designed to be mounted on wheels, so that the apparatus can be conveniently moved from place to place.

The machine can also be arranged in a horizontal or inclined position and used for excavating and grading; and in this use of the machine it will be seen that the chain-guides are, if possible, of still greater importance.

When digging in wet or sticky soil a rapper or knocker consisting of a spring, X, having a head, *x*, is attached to or formed upon the lower part of the ring M in such a position that the spring X will be struck by the pins $x'$ on one of the chain-wheels S, to draw the spring back and cause the head *x*, when the spring is released from the pin, to strike each bucket, or to hit the chain and jar the buckets to cause them to discharge all their contents into the spout U.

Having thus described my invention, the following is what I claim as new therein and desire to secure by Letters Patent:

1. The combination of guide-posts A A, having slots *a a*, bracing devices C B D, the cross-bar I, having cross heads *i i*, the bail H, vertical ring M, and shaft L, as set forth.

2. In combination with the auger and endless chain and buckets and driving mechanism, the rapper X *x*, secured to the ring M and operated upon by pins on one of the chain-wheels, substantially as and for the purpose set forth.

3. The combination of bail H, carrying toothed rim K, the vertical ring M, horizontal elevator-shaft *m*, carrying wheels $m'$ and $m^2$, and the connecting-shaft L, as set forth.

4. The combination of bail H, having rim K, formed with toothed portion and a smooth portion, $k'$, and the ring M, having shaft *m*, carrying rollers $m'$ $m^2$, as set forth.

5. The disk-guide W, having openings *w w*, and the shaft N, having couplings O, for supporting the disk-guides, in combination with chain of buckets and auger, as set forth.

6. In an earth-digging auger wherein an endless chain of buckets is employed, a guide for the said chain, in combination with the auger-shaft or its coupling, substantially as set forth.

7. The combination, with a sectional shaft, N, of the coupling O, having lugs *o*, provided with orifices for receiving the hook of the hoisting-chain, as set forth.

JOHN W. CARLEY.

In presence of—
GEO. H. KNIGHT,
AUGUST WEBER.